(12) United States Patent
Hauschild

(10) Patent No.: US 12,135,014 B2
(45) Date of Patent: Nov. 5, 2024

(54) METHOD AND DEVICE FOR DETERMINING A ROTOR ORIENTATION OF A ROTOR OF A WIND TURBINE

(71) Applicant: Wobben Properties GmbH, Aurich (DE)

(72) Inventor: Luciano Hauschild, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 157 days.

(21) Appl. No.: 17/610,658

(22) PCT Filed: May 5, 2020

(86) PCT No.: PCT/EP2020/062441
§ 371 (c)(1),
(2) Date: Nov. 11, 2021

(87) PCT Pub. No.: WO2020/229226
PCT Pub. Date: Nov. 19, 2020

(65) Prior Publication Data
US 2022/0235738 A1    Jul. 28, 2022

(30) Foreign Application Priority Data

May 16, 2019   (DE) ..................... 10 2019 112 976.1

(51) Int. Cl.
*F03D 7/04* (2006.01)
*F03D 7/02* (2006.01)
(Continued)

(52) U.S. Cl.
CPC .......... *F03D 7/048* (2013.01); *F03D 7/0204* (2013.01); *G01S 19/14* (2013.01); *G01S 19/24* (2013.01);
(Continued)

(58) Field of Classification Search
CPC ...... F03D 7/048; F03D 7/0204; F03D 7/0224; F03D 17/00; G01S 19/14; G01S 19/24; F05B 2270/321
See application file for complete search history.

(56) References Cited

U.S. PATENT DOCUMENTS 9,511,878 B1 * 12/2016 McDermott ............ B64C 27/08
9,777,711 B2   10/2017 Rossetti
(Continued)

FOREIGN PATENT DOCUMENTS

DE    102013014622 A1    3/2015
DE    102015122126 A1    6/2017
(Continued)

*Primary Examiner* — Pedro J Cuevas
(74) *Attorney, Agent, or Firm* — Seed IP Law Group LLP

(57) ABSTRACT

A method for determining a rotor orientation of a rotor of a wind turbine, the rotor having a rotor blade, to a method for determining a geographical position of a rotor of a wind turbine, the rotor having a rotor blade, to a wind turbine and to a wind farm. A method for determining a rotor orientation of a rotor of a wind turbine, the rotor having a rotor blade, comprising the steps of: receiving at least two sets of position data of a GNSS receiver arranged in the rotor blade, the two sets of position data representing two different horizontal positions of the GNSS receiver; and ascertaining the rotor orientation of the rotor on the basis of the position data.

4 Claims, 7 Drawing Sheets

(51) Int. Cl.
  *F03D 17/00* (2016.01)
  *G01S 19/14* (2010.01)
  *G01S 19/24* (2010.01)

(52) U.S. Cl.
  CPC ............ *F03D 7/0224* (2013.01); *F03D 17/00* (2016.05); *F05B 2270/321* (2013.01)

(56) References Cited

U.S. PATENT DOCUMENTS

| | | | |
|---|---|---|---|
| 10,187,580 B1* | 1/2019 | Beard | G05D 1/0094 |
| 10,969,500 B2 | 4/2021 | Weber et al. | |
| 11,036,240 B1* | 6/2021 | Irschara | G01S 19/24 |
| 11,084,576 B2* | 8/2021 | Caldwell | B64D 35/00 |
| 11,174,021 B2* | 11/2021 | Anderson | B60L 53/50 |
| 11,703,033 B2* | 7/2023 | Landa | F03D 7/0204 |
| | | | 290/44 |
| 2010/0194603 A1 | 8/2010 | Wobben | |
| 2016/0222946 A1 | 8/2016 | Krings | |
| 2019/0071172 A1* | 3/2019 | Caldwell | B64C 27/64 |
| 2020/0124030 A1* | 4/2020 | Egedal | F03D 17/00 |
| 2022/0325699 A1* | 10/2022 | Landa | F03D 7/0204 |
| 2023/0052609 A1* | 2/2023 | Glavind | G01S 19/53 |

FOREIGN PATENT DOCUMENTS

| | | |
|---|---|---|
| EP | 2263126 A | 9/2009 |
| EP | 2175130 A2 | 4/2010 |
| EP | 2202407 A2 | 6/2010 |
| EP | 2333316 A2 | 6/2011 |
| EP | 2457818 B1 | 9/2013 |
| WO | 2018/177615 A1 | 10/2018 |

* cited by examiner

METHOD AND DEVICE FOR DETERMINING A ROTOR ORIENTATION OF A ROTOR OF A WIND TURBINE

BACKGROUND

Technical Field

The invention relates to a method for determining a rotor orientation of a rotor with a rotor blade of a wind turbine, to a method for determining a geographical position of a rotor with a rotor blade of a wind turbine, to a wind turbine and to a wind farm.

Description of the Related Art

Wind turbines are fundamentally known; they produce electrical power from wind. Knowledge of the orientation of a rotor is needed to measure the power of wind turbines and to evaluate the wind tracking taking into account a wind direction measured by a meteorological mast. This orientation relates, in particular, to the orientation of the rotor according to the compass directions. In particular, it is necessary to determine an exact north orientation, such that the power of the wind turbine in predefined compass direction sections is known.

Wind turbines are also often installed in delimited local areas and together form a wind farm. A wind farm generally comprises a multiplicity of wind turbines. The wind turbines in a wind farm may shield one another in the case of certain compass directions. In this case, so-called wake losses may arise. In order to detect shielding of a wind turbine by a further wind turbine using system technology, knowledge of the exact orientation of the wind turbines is required.

In order to determine the orientation of a wind turbine, the latter is generally targeted during start-up from a predetermined distance using a compass bearing and the orientation is derived therefrom. The targeting is often carried out on the spinner or the rotor hub.

DE 10 2015 122 126 A1 describes a method for determining an azimuth angle of a wind turbine by determining the azimuth angle using GNSS receivers arranged in the nacelle. A GNSS compass which is arranged inside the nacelle is also described. EP 2 333 316 A2 describes the use of GPS sensors on a wind turbine in order to avoid cable twisting in the tower.

The German Patent and Trademark Office carried out a search in respect of the following prior art in the priority application for the present application: EP 2 333 316 A2, DE 10 2015 122 126 A1, EP 2 457 818 B1, DE 10 2013 014 622 A1.

BRIEF SUMMARY

Provided is a method for determining a rotor orientation of a rotor with a rotor blade of a wind turbine, a method for determining a geographical position of a rotor with a rotor blade of a wind turbine, a wind turbine and a wind farm, which enable improved orientation accuracy of a wind turbine. In particular, provided is one or more techniques, which enable a more exact north orientation of a rotor of a wind turbine at low cost.

According to a first aspect, provided is a method for determining a rotor orientation of a rotor with a rotor blade of a wind turbine, comprising the steps of receiving at least two items of position data from a GNSS receiver arranged in the rotor blade, wherein the two items of position data represent two different horizontal positions of the GNSS receiver, and determining the rotor orientation of the rotor on the basis of the position data.

A rotor orientation should be understood as meaning, in particular, the orientation of the rotor according to the compass directions. The four main compass directions, also called cardinal points, are north, east, south and west. For more accurate orientation, the compass directions are more finely subdivided multiple times. In particular, they are also stated in degrees, wherein north corresponds to 0 degrees, east corresponds to 90 degrees, south corresponds to 180 degrees and west corresponds to 270 degrees. Exact orientations may also be stated between these main compass directions, for example 3 degrees. The rotor orientation may correspond, for example, to the surface orthogonal which is covered by a rotating rotor.

At least two items of position data from the GNSS receiver arranged in the rotor blade are received. The abbreviation GNSS stands for Global Navigation Satellite system and is a collective term for the use of existing and future global satellite systems such as GPS (Global Positioning System), GLONASS (Global Navigation Satellite System), Galileo or BEIDOU and different (satellite-based) supplementary or additional systems. Supplementary or additional systems improve the position accuracy, for example DGPS (Differential Global Positioning System), RTK GPS (Real Time Kinematics Global Positioning System) or SBAS (Satellite Based Augmentation Systems). The term GNSS is also understood as comprising Regional Navigation Satellite Systems (RNSS). In particular, the relative position between two receivers can by now be accurately determined to a few centimeters using systems such as DGPS or RTK GPS.

A GNSS receiver should be understood as meaning, in particular, a unit which can determine its own position from satellite signals from a GNSS, that is to say a global navigation satellite system. In the case of the GNSS receiver described above, it may be sufficient for it to only be able to determine the position in a horizontal direction. The GNSS receiver may receive, in particular, four or more satellite signals. The GNSS receiver is preferably configured to evaluate the received satellite signals, in particular four or more satellite signals, and to determine a position, in particular a horizontal position. In addition, it may be preferred for the GNSS receiver to be configured to forward the position data representing the position. The GNSS receiver is preferably arranged at a distance from an axis of rotation of the rotor.

The two items of position data represent two different horizontal positions of the GNSS receiver. A horizontal position is understood as meaning, in particular, a position in space disregarding the vertical component. In a Cartesian coordinate system with a horizontal X, Y orientation and a vertical Z orientation, the horizontal position is defined, for example, by an X, Y coordinate.

During the rotation of a rotor blade, preferably about a rotor axis, the GNSS receiver arranged in the rotor blade performs a circular movement. If the vertical component is disregarded, the GNSS receiver moves back and forth in the X, Y plane. This back and forth movement is carried out on a straight line with two reversal points when the rotor is stationary with respect to its vertical axis of rotation, that is to say the azimuth drive is not active. In the case of two different horizontal positions, it is therefore possible to define a direction between a first horizontal position and a second horizontal position. In particular, this direction can be defined in Cartesian X, Y coordinates, for example by means of a vector. This direction of the distance between the two different horizontal positions of the GNSS receiver can be used to determine the rotor orientation.

The invention is based on the knowledge that GNSS receivers often do not provide exact position data. On account of this, exact positioning by means of one or two GNSS receivers in the nacelle cannot be guaranteed. This is due, on the one hand, to the fundamental fuzziness of conventional GNSS and, on the other hand, to the shielding by the nacelle housing. Systems with a higher degree of accuracy are sometimes not available at locations of wind turbines. In addition, systems with a higher degree of accuracy may result in higher costs.

On account of this inaccuracy, GNSS compasses, inter alia, were used in the past in order to be able to determine an exact position, but these compasses are too expensive for comprehensive use.

The invention was now also based on the knowledge that, although the determined positions may deviate from the actual positions, the connecting line between two determined positions is always oriented parallel to a connecting line of the actual positions. This knowledge makes use of the method described above by virtue of the connecting line between the two different determined horizontal positions, which is oriented at least parallel to the actual connecting line, being transverse with respect to the actual rotor orientation.

One advantageous development of the method for determining the rotor orientation provides for this method to comprise the step of: determining a horizontal line of movement of the GNSS receiver by evaluating the at least two items of position data.

The horizontal line of movement can be understood, in particular, as meaning the connecting line of the two different horizontal positions of the GNSS receiver, disregarding vertical position data. The connecting line of the two different horizontal positions can therefore also comprise a vertical component, but this vertical component is disregarded when determining the horizontal line of movement. The horizontal line of movement is generally oriented at right angles to the rotor orientation of the rotor.

In a further preferred embodiment variant of the method for determining a rotor orientation, this method preferably comprises the step of: converting the horizontal line of movement by 90 degrees in order to determine the rotor orientation. Since the horizontal line of movement is generally oriented at right angles to the rotor orientation of the rotor, a rotor orientation can be determined by converting this horizontal line of movement by 90 degrees.

A further preferred embodiment variant of the method for determining a rotor orientation provides for this method to comprise the step of: receiving a multiplicity of items of position data from the GNSS receiver, which represent different horizontal positions of the GNSS receiver, at a frequency of greater than 0.1 Hz, greater than 0.5 Hz, greater than 1 Hz and/or greater than 2 Hz.

An accurate movement profile of the GNSS receiver in the horizontal direction on its circular path can be determined by receiving a multiplicity of items of position data from the GNSS receiver, which represent a multiplicity of horizontal positions of the GNSS receiver. The lines of movement, in particular the horizontal lines of movement of the GNSS receiver, can also be determined on the basis of this exact circular path. The rotor orientation can then be exactly determined on the basis of these accurate horizontal lines of movement.

In particular, the movement of the rotor about a vertical axis, for example by means of an azimuth drive, can be disregarded by receiving a multiplicity of items of position data within a short time, for example at a frequency of between 1 Hz and 2 Hz. The azimuth of a rotor is generally adjusted at a low speed, with the result that approximately horizontal lines of movement can be determined at a conventional rotor speed and with high-frequency position data collection. The speed of movement about the vertical axis is low in comparison with the rotational speed of movement of the rotor about its substantially horizontal rotation axis. The rotor orientation can therefore be accurately determined independently of a movement about a vertical axis by collecting a very large number of data items from the GNSS receiver.

A further preferred development of the method provides for this method to comprise the step of: monitoring the rotor orientation during operation of the rotor. In addition to the above-described use of an exact rotor orientation during start-up, for example, this step makes it possible to continuously monitor the rotor orientation during operation of the rotor. This makes it possible to verify an orientation determined by an azimuth sensor, for example. In addition, this signal can be forwarded to a central controller of the wind turbine and can be processed there. For example, this value can also be taken into account for the purpose of determining wake effects for other wind turbines.

A further preferred development of the method for determining the rotor orientation provides for this method to comprise the step of: aligning the rotor with a predefined rotor orientation on the basis of the determined rotor orientation. The predefined rotor orientation may be determined, for example, on the basis of an anemometer. The rotor orientation of a rotor of a wind turbine is preferably parallel to a wind direction. In the case of an upwind rotor in particular, provision is made for the rotor orientation to be opposite to the wind direction. An exact orientation of the rotor in the direction of the wind direction with respect to a wind direction measured by a meteorological mast can be verified by determining the rotor orientation by means of two items of position data of two different horizontal positions of the GNSS receiver. This makes it possible to optimize the wind tracking and to increase the power, in particular as long as the wind turbine is operated in the partial load range.

A further preferred embodiment variant of the method provides for this method to comprise the step of: comparing the determined rotor orientation with an orientation value from an azimuth sensor and/or with the predefined rotor orientation. This comparison makes it possible to determine a deviation of the actual rotor orientation from a measured value, for example the orientation value from the azimuth sensor. This deviation may then be the basis of a correction value in order to actually achieve a predefined rotor orientation.

According to a further aspect, provided is a method for determining a geographical position of a rotor with a rotor blade of a wind turbine, comprising the steps of: receiving at least two items of first position data from a GNSS receiver arranged in the rotor blade, wherein the two items of first position data represent two different horizontal positions of the GNSS receiver, and determining a first rotor orientation on the basis of the first position data; receiving at least two items of second position data from the GNSS receiver and determining a second rotor orientation, which differs from the first rotor orientation, on the basis of the second position data; and determining the geographical position of the rotor on the basis of the first rotor orientation and the second rotor orientation.

The invention is also based on the knowledge that the geographical position of the rotor can be precisely determined on the basis of the determination of a first rotor orientation and a second rotor orientation. For example, this can be carried out by determining a point of intersection of the two rotor orientations. The determination of a first rotor orientation and a second rotor orientation, which differs from the first rotor orientation, generally requires the rotation of the rotor about its substantially vertical axis.

The method for determining a geographical position of the rotor is advantageously developed by the step of: determining a point of intersection of the first rotor orientation and the second rotor orientation and determining a geographical position of the point of intersection on the basis of the position data.

The point of intersection of the two rotor orientations may characterize, for example, the geographical position of the rotor. In addition, the point of intersection may also be the basis of a calculation of the geographical position of the rotor, for example in the case of an accordingly desired location of the geographical position relative to the horizontal extent of the wind turbine. For example, the geographical position of the rotor may be a spinner of the rotor or alternatively a vertical axis of rotation of the wind turbine.

According to a further aspect, provided is a method for controlling a wind farm, comprising the steps of: determining a rotor orientation of a rotor with a rotor blade of a first wind turbine according to at least one of the above-described embodiment variants of the method, and/or determining a geographical position of a rotor with a rotor blade of a or the first wind turbine according to at least one of the above-described embodiment variants of the method; transmitting the rotor orientation and/or the geographical position to a wind farm controller; and controlling the wind farm taking into account the rotor orientation and/or the geographical position. The control of a wind farm can be advantageously influenced by the knowledge of the exact orientations of the wind turbine.

For example, this method may comprise the step of: curtailing a first wind turbine and/or a second wind turbine if the rotor orientation of the first wind turbine and/or of the second wind turbine is in a predefined direction range.

The second wind turbine may be downwind of the first wind turbine, for example. The second wind turbine is therefore influenced by wake effects of the first wind turbine. In this case, it may be preferred for the first wind turbine to be controlled differently. It may also be preferred for the first wind turbine to be switched off in this case.

It is also preferred for the method to comprise the step of checking the wind tracking during a power measurement. It is also preferred for the method to be used to optimize the power of a wind farm.

The method can also be used to improve the data quality. This may be, for example, a power prediction which is used for energy trading on the spot market. The method can also be used for wind farm planning. In order to plan a new wind farm, the data from existing wind farms in a defined surrounding area, for example 20 km, are usually used to predict energy.

A further preferred embodiment variant of the method for controlling the wind farm provides for this method to comprise the step of: capturing the time signal received from the GNSS receiver of the first wind turbine and capturing the time signal received from the GNSS receiver of a or the second wind turbine, and synchronizing navigation lights of the first and second wind turbines taking into account the captured time signals. The signals from navigation satellite systems generally contain a time component which is referred to as a time signal above.

According to a further aspect, provided is a wind turbine comprising a rotor with a rotor blade having a GNSS receiver at a distance from an axis of rotation of the rotor, and a controller, wherein the GNSS receiver is coupled to the controller using signaling technology, wherein the controller is configured to receive position data from the GNSS receiver, wherein the position data represent at least two different horizontal positions of the GNSS receiver, and to determine the rotor orientation of the rotor on the basis of the position data.

The controller can preferably be configured to determine a horizontal line of movement of the GNSS receiver by evaluating the at least two items of position data. The controller may also be configured to convert the horizontal line of movement by 90 degrees in order to determine the rotor orientation. It is also preferred for a multiplicity of items of position data from the GNSS receiver to be received, wherein these position data represent different horizontal positions of the GNSS receiver. For example, this multiplicity of items of position data may be received at a frequency of greater than 0.1 Hz, greater than 0.5 Hz, greater than 1 Hz and/or greater than 2 Hz.

It is also preferred for the controller to be configured to monitor the rotor orientation during operation of the rotor. It may also be preferred for the controller to be configured to compare the determined rotor orientation with an orientation value from an azimuth sensor and/or with a predefined rotor orientation.

It is also preferred for the controller to be configured to receive at least two items of first position data from the GNSS receiver and to determine a first rotor orientation on the basis of the first position data, and to receive at least two items of second position data from the GNSS receiver and to determine a second rotor orientation on the basis of the second position data, and to determine a geographical position of the rotor on the basis of the first rotor orientation and the second rotor orientation.

The controller may be arranged inside the wind turbine, for example inside the nacelle. In addition, the controller may also be arranged at a location remote from the wind turbine. This may be a wind farm control system, for example. It is preferred for the GNSS receiver to be at a distance of more than 3 meters, preferably more than 5 meters, from the axis of rotation of the rotor.

According to a further aspect, provided is a wind farm comprising a first wind turbine and a second wind turbine as claimed in the preceding claim, a wind farm controller which is configured to receive a first rotor orientation of the first wind turbine and a second rotor orientation of the second wind turbine and to control the first wind turbine and the second wind turbine on the basis of the first rotor orientation and/or the second rotor orientation.

The wind turbine and the wind farm and their possible developments have features which make them suitable, in particular, for use for a method for determining a rotor orientation and for a method for determining a geographical position of a rotor, as explained above. For further advantages, embodiment variants and embodiment details of the further aspects and their possible developments, reference is also made to the above description of the corresponding features and developments of the method for determining a rotor orientation of a rotor with a rotor blade of a wind turbine.

BRIEF DESCRIPTION OF THE SEVERAL VIEWS OF THE DRAWINGS

Preferred exemplary embodiments are explained by way of example on the basis of the accompanying figures, in which.

In the figures, identical or substantially functionally identical or functionally similar elements are denoted with the same reference signs.

DETAILED DESCRIPTION

Figure 1:
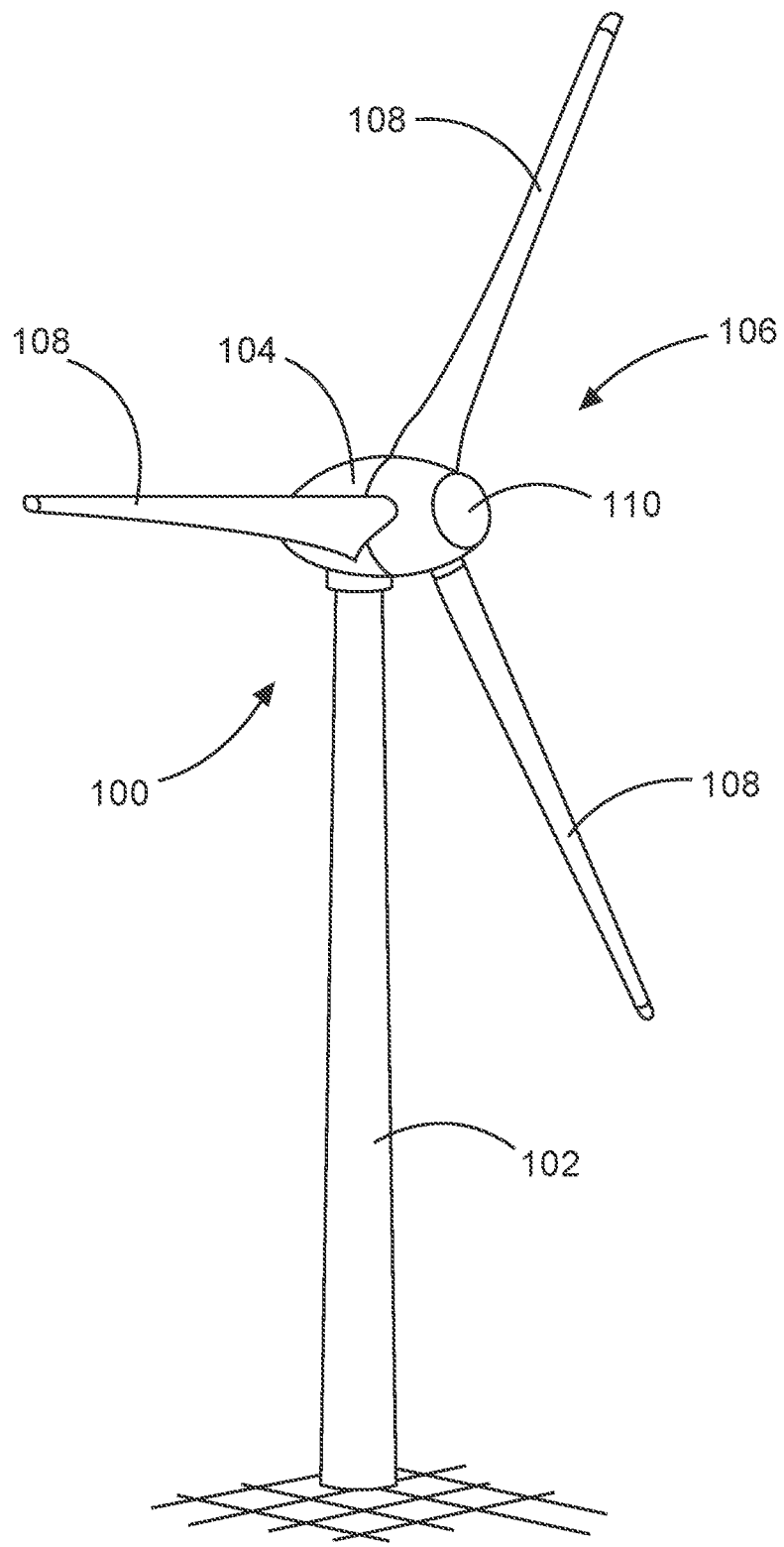
FIG. 1 shows a schematic illustration of a wind turbine.

FIG. 1 shows a schematic illustration of a wind turbine 100. The wind turbine 100 has a tower 102 and a nacelle 104 on the tower 102. An aerodynamic rotor 106 having three rotor blades 108 and a spinner 110 is provided on the nacelle 104. The aerodynamic rotor 106 is caused to rotate by the wind during operation of the wind turbine 100, wherein this rotational movement is effected about a rotor axis. As a result of this rotational movement, an electrodynamic rotor of a generator, which is directly or indirectly coupled to the aerodynamic rotor 106, also rotates. The electric generator is arranged in the nacelle 104 and produces electrical energy. The pitch angles of the rotor blades 108 can be changed by means of pitch motors at the rotor blade roots of the respective rotor blades 108.

A GNSS receiver is arranged at least in one of the rotor blades 108 at a distance from the axis of rotation of the rotor 106. The GNSS receiver may be in the form of a GPS receiver, for example. As a result of the rotation of the rotor 106 about the rotor axis, the GNSS receiver at a distance from the rotor axis moves on a circular path. The wind turbine 100 also has a controller which is configured to receive position data from the GNSS receiver, wherein the position data represent at least two different horizontal positions of the GNSS receiver, and is designed to determine the rotor orientation of the rotor on the basis of the position data. The GNSS receiver may be at a distance of 3 meters, preferably more than 5 meters, from the axis of rotation of the rotor 106, for example.

Figure 2:
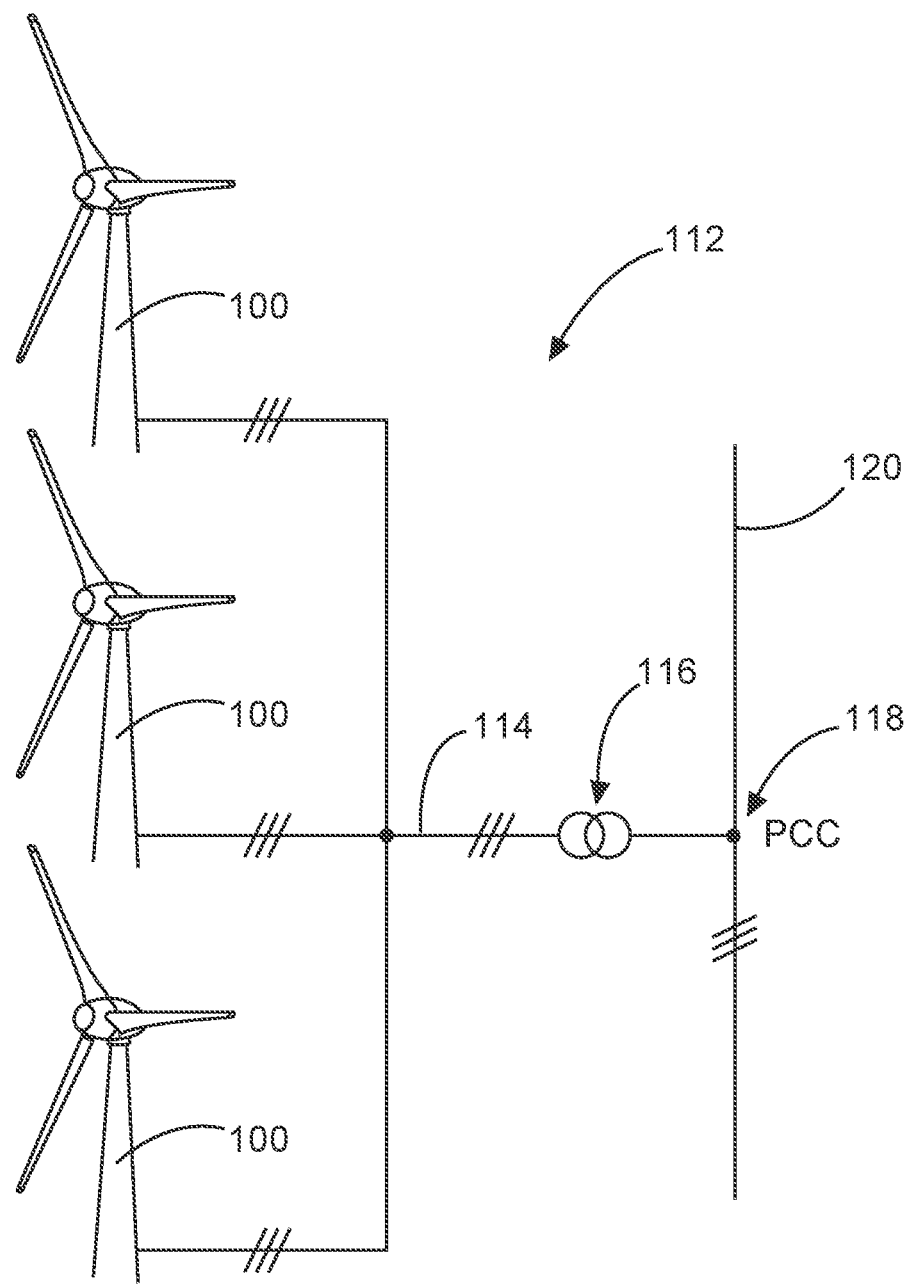
FIG. 2 shows a schematic illustration of a wind farm.

FIG. 2 shows a wind farm 112 having, by way of example, three wind turbines 100 which may be the same or different. The three wind turbines 100 are therefore representative of fundamentally any desired number of wind turbines in a wind farm 112. The wind turbines 100 provide their power, in particular the current produced, via an electrical farm network 114. The respectively produced currents or powers of the individual wind turbines 100 are generally added, and a transformer 116 is usually provided and steps up the voltage in the farm in order to then feed it into the supply network 120 at the feed-in point 118, also generally referred to as the PCC.

FIG. 2 is a simplified illustration of a wind farm 112 which does not show a wind farm controller, for example, even though a wind farm controller is naturally present. The farm network 114 may also be configured differently, for example, by virtue of a transformer, for example, also being present at the output of each wind turbine 100, to name just one other exemplary embodiment.

The wind farm controller is configured, in particular, to receive a first rotor orientation of one of the wind turbines 100 and a second rotor orientation of another wind turbine 100 and to control the first wind turbine 100 and the second wind turbine 100 on the basis of the first rotor orientation and/or the second rotor orientation.

Figure 3:
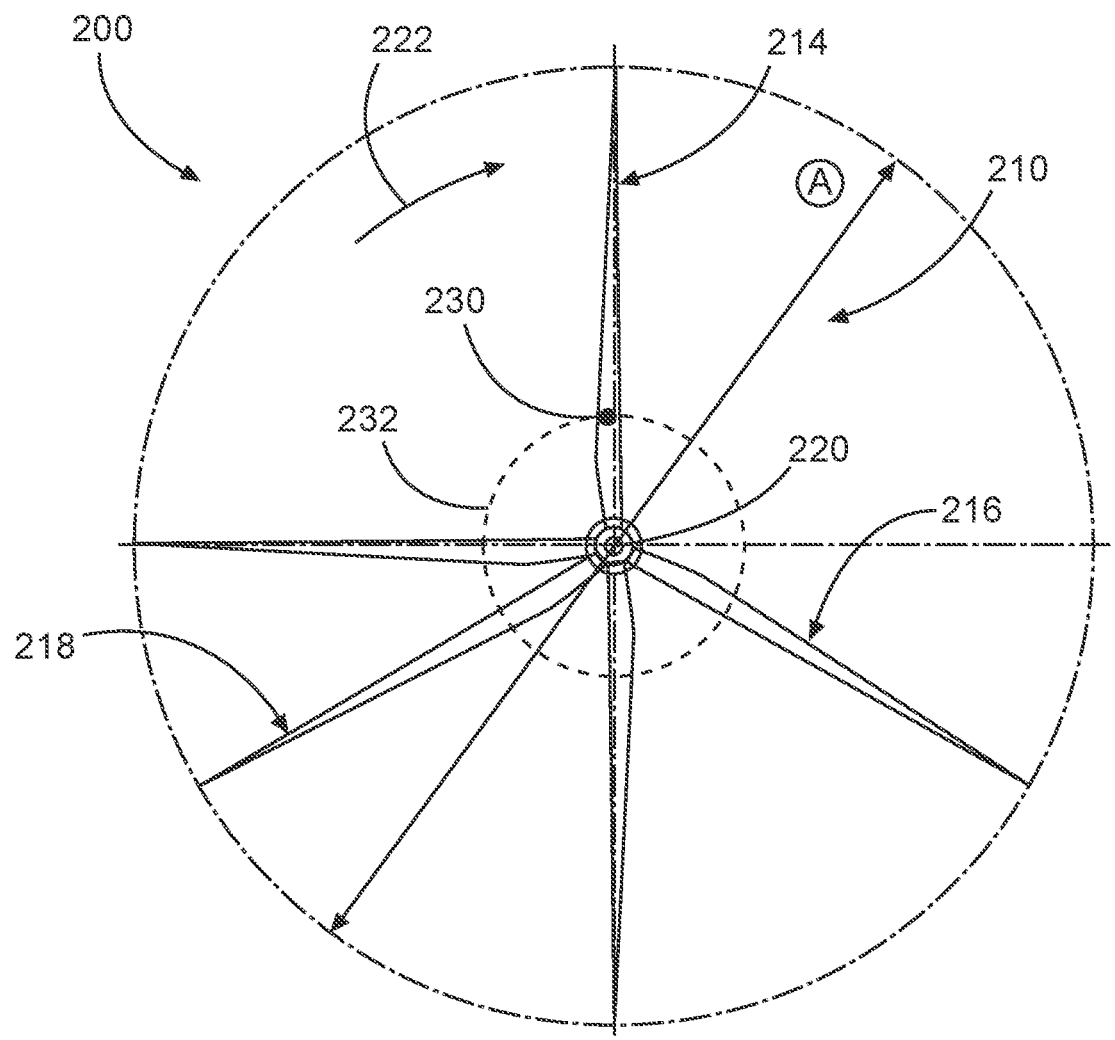
FIG. 3 shows a schematic, two-dimensional view of a rotor of a wind turbine.

FIG. 3 shows a schematic, two-dimensional view of a rotor of a wind turbine 200. The wind turbine 200 comprises a rotor 210 which is arranged on the nacelle 212 such that it can rotate about a rotor axis 220. The rotor 210 has a first rotor blade 214, a second rotor blade 216 and a third rotor blade 218. The rotor 210 is caused to move in a direction of rotation 222 about the rotor axis 220 by the wind. As a result of the movement of the rotor 210 about the rotor axis 220, the GNSS receiver 230 arranged at a distance from the rotor axis 220 performs a circular movement on a movement path 232.

Figure 4:
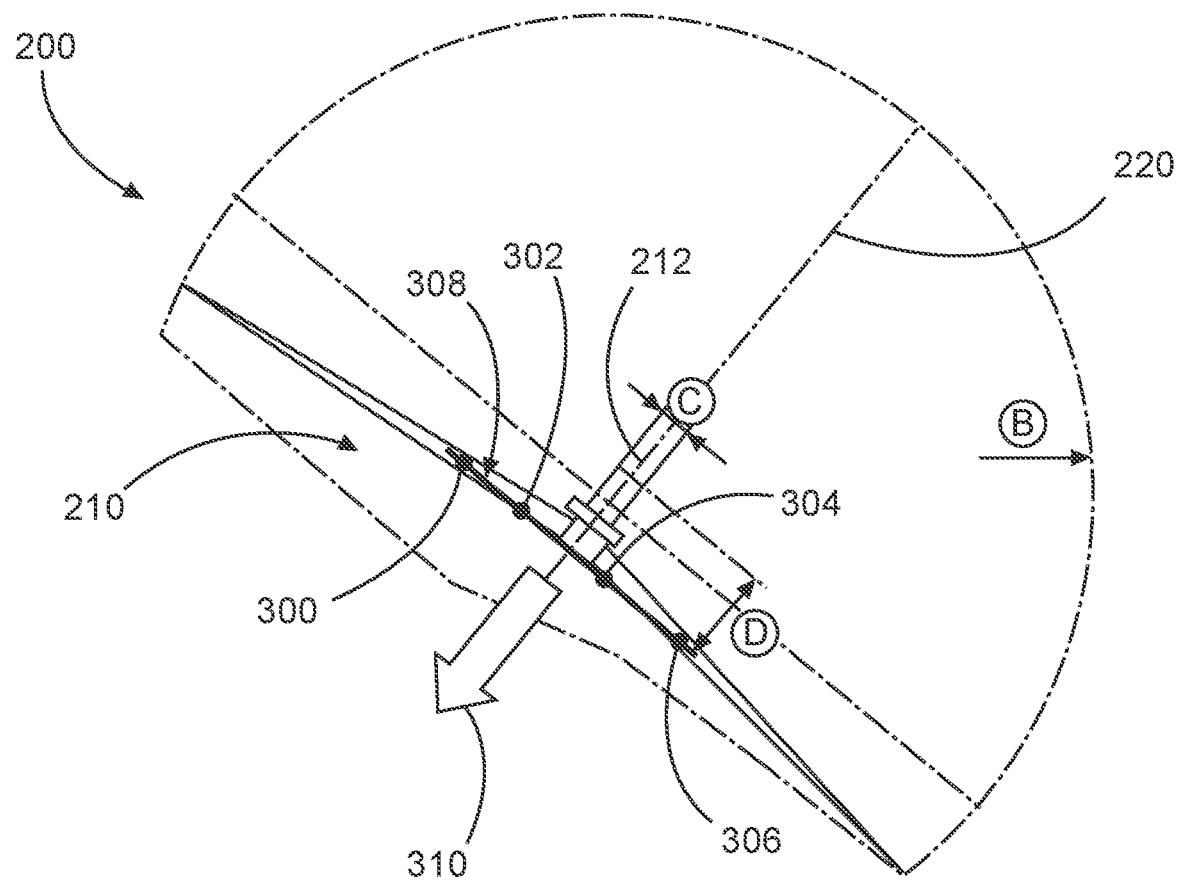
FIG. 4 shows a schematic, two-dimensional plan view of the wind turbine from FIG. 3.

If the vertical coordinate of the movement path 232 is disregarded, the GNSS receiver 230 performs the horizontal movement shown in FIG. 4 on the horizontal line of movement 308. For example, the GNSS receiver 230 may transmit a first horizontal position 300, a second horizontal position 302, a third horizontal position 304 and a fourth horizontal position 306 to a controller or may provide these positions. These positions 300, 302, 304, 306 are provided in the form of position data. A controller can determine the horizontal line of movement 308 on the basis of these position data. The rotor orientation 310 can be determined by converting the horizontal line of movement 308 by 90 degrees.

Figure 5:
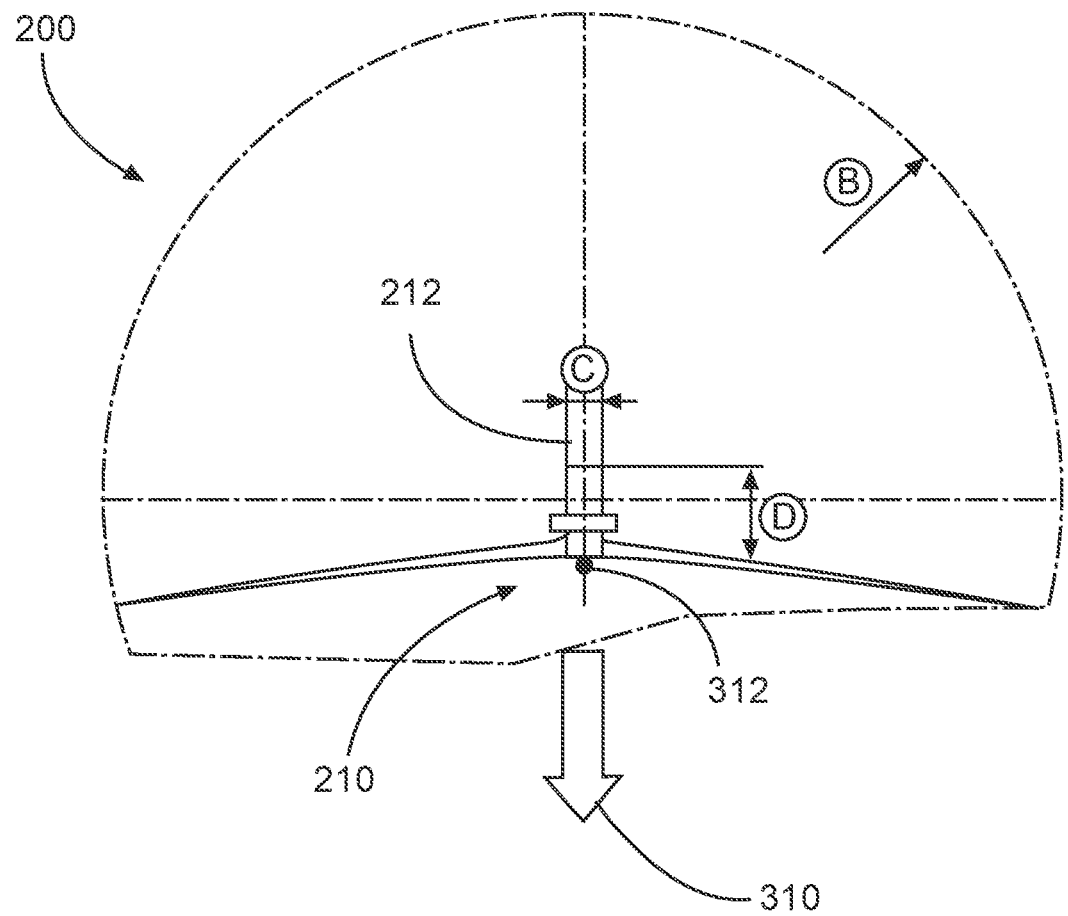
FIG. 5 shows a further schematic, two-dimensional plan view of the wind turbine from FIG. 3.

A mean value 312 can be determined, as schematically shown in FIG. 5, by determining horizontal lines of movement 308 in the long term, in particular in the case of different rotor orientations 310. The mean value 312 represents a geographical position of the rotor 210.

Figure 6:
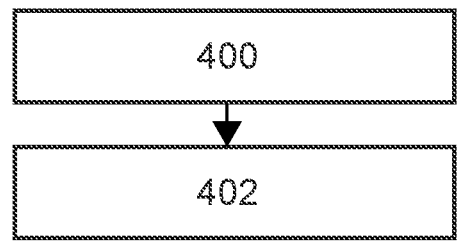
FIG. 6 shows a schematic method for determining a rotor orientation of a rotor with a rotor blade of a wind turbine.

FIG. 6 shows a schematic method for determining a rotor orientation 310 of a rotor 106, 210 with a rotor blade 108, 218 of a wind turbine 100, 200. In step 400, at least two items of position data from a GNSS receiver 230 arranged in the rotor blade 108, 218 are received, wherein the two items of position data represent two different horizontal positions 300, 302, 304, 306 of the GNSS receiver 230. The rotor orientation 310 is determined on the basis of these position data in step 402.

Figure 7:
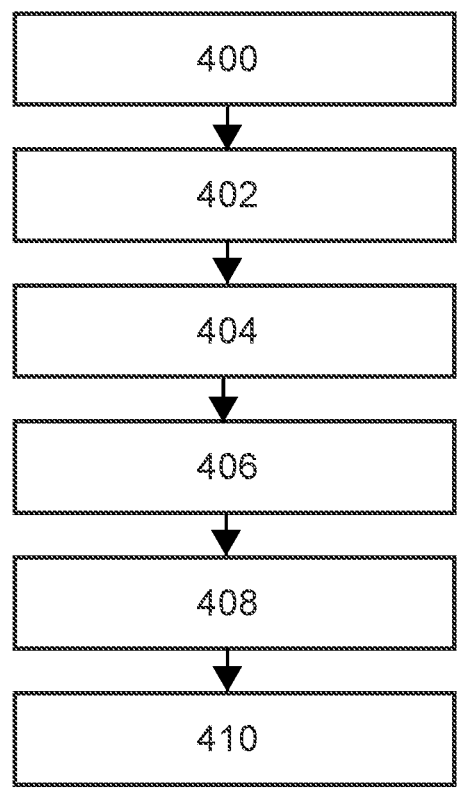
FIG. 7 shows a further method for determining a rotor orientation of a rotor with a rotor blade of a wind turbine.

FIG. 7 shows a further method for determining a rotor orientation 310 of a rotor 106, 210 with a rotor blade 108, 218 of a wind turbine 100, 200. The method for determining the rotor orientation 310 of the rotor 106, 210 with a rotor blade 108, 218 of a wind turbine 100 is supplemented with further steps here.

In step 404, a horizontal line of movement 308 of the GNSS receiver 230 is determined by evaluating the at least two items of position data. In step 406, this horizontal line of movement is converted by 90 degrees in order to determine the rotor orientation 310.

In step 406, the rotor orientation 310 is monitored during operation of the rotor 106, 210. In step 408, the rotor is aligned with a predefined rotor orientation on the basis of the determined rotor orientation 310. In step 410, the determined rotor orientation 310 is compared with an orientation value from an azimuth sensor and/or with a predefined rotor orientation.

Figure 8:
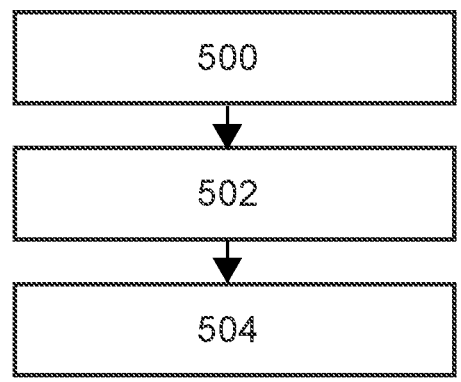
FIG. 8 shows a method for determining a geographical position of a rotor with a rotor blade of a wind turbine.

FIG. 8 shows a method for determining a geographical position of a rotor 106, 210 with a rotor blade 108, 218 of a wind turbine 100, 200. In step 500, at least two items of first position data from the GNSS receiver 230 arranged in the rotor blade 108, 218 are received, wherein the two items of first position data represent two different horizontal positions of the GNSS receiver 230. A first rotor orientation is determined on the basis of these first position data.

In step 502, this step is repeated for a second rotor orientation, wherein the rotor 106, 210 has preferably rotated about a vertical axis.

In step 504, the geographical position of the rotor 106, 210 is determined on the basis of the first rotor orientation and the second rotor orientation.

Figure 9:
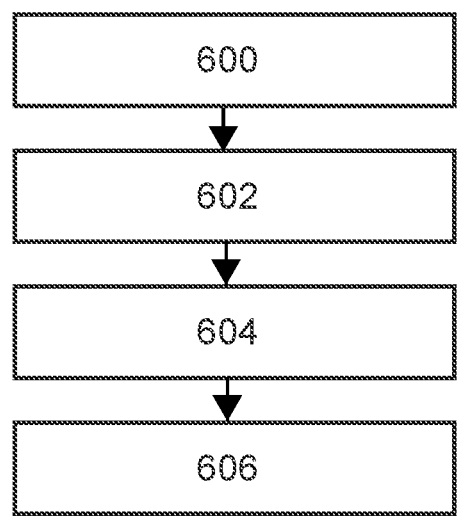
FIG. 9 shows a schematic method for controlling a wind farm.

FIG. 9 shows a schematic method for controlling a wind farm 112. In step 600, a rotor orientation 310 of a rotor 106, 210 with a rotor blade 108, 218 of a first wind turbine 100 is determined according to one of the embodiment variants described above. In step 602, a geographical position of the rotor 106, 210 with a rotor blade 108, 218 of a or the first wind turbine 100 is determined, in addition or as an alternative to step 600, according to one of the embodiment variants described above.

In step 604, the rotor orientation and/or the geographical position is/are transmitted to a wind farm controller. In step 606, the wind farm 112 is controlled on the basis of the rotor orientation and/or the geographical position.

REFERENCE SIGNS

100 Wind turbine
102 Tower
104 Nacelle
106 Rotor
108 Rotor blades
110 Spinner
112 Wind farm
114 Electrical farm network
116 Transformer
118 Feed-in point
120 Supply network
200 Wind turbine
210 Rotor
212 Nacelle
214 First rotor blade
216 Second rotor blade
218 Third rotor blade
220 Rotor axis
222 Direction of rotation
230 GNSS receiver
232 Movement path
300 First horizontal position
302 Second horizontal position
304 Third horizontal position
306 Fourth horizontal position
308 Horizontal line of movement
310 Rotor orientation
312 Mean value

The invention claimed is:

1. A method for determining a geographical position of a rotor with a rotor blade of a wind turbine, the method comprising:
receiving at least two items of first position data from a GNSS (Global navigation satellite system) receiver arranged in the rotor blade, wherein the at least two items of first position data represent two different horizontal positions of the GNSS receiver, and determining a first rotor orientation based on the first position data;
receiving at least two items of second position data from the GNSS receiver and determining a second rotor orientation based on the second position data, wherein the second rotor orientation differs from the first rotor orientation; and
determining the geographical position of the rotor based on the first rotor orientation and the second rotor orientation.

2. The method as claimed in claim 1, comprising:
determining a point of intersection of the first rotor orientation and the second rotor orientation and determining a geographical position of the point of intersection based on the position data.

3. A wind farm comprising:
a first wind turbine and a second wind turbine, wherein the first wind turbine and the second wind turbine each include:
a rotor with a rotor blade having a GNSS (Global navigation satellite system receiver at a distance from an axis of rotation of the rotor, and
a controller,
wherein:
the GNSS receiver is coupled to the controller using signaling technology, and
the controller is configured to receive position data from the GNSS receiver, wherein the position data represent at least two different horizontal positions of the GNSS receiver, and wherein the controller is configured to determine the rotor orientation of the rotor based on the position data; and
a wind farm controller configured to receive a first rotor orientation of the first wind turbine and a second rotor orientation of the second wind turbine, and wherein the wind farm controller is configured to control the first wind turbine and the second wind turbine based on at least one of the first rotor orientation or the second rotor orientation.

4. The wind turbine as claimed in claim 3, wherein the GNSS receiver is at a distance of more than 3 meters from the axis of rotation of the rotor.

* * * * *

UNITED STATES PATENT AND TRADEMARK OFFICE
CERTIFICATE OF CORRECTION

| | | |
|---|---|---|
| PATENT NO. | : 12,135,014 B2 | Page 1 of 1 |
| APPLICATION NO. | : 17/610658 | |
| DATED | : November 5, 2024 | |
| INVENTOR(S) | : Luciano Hauschild | |

It is certified that error appears in the above-identified patent and that said Letters Patent is hereby corrected as shown below:

In the Claims

<u>Column 10, Claim 3, Lines 35-36:</u>
"(Global navigation satellite system receiver"
Should read:
--(Global navigation satellite system) receiver--.

Signed and Sealed this
Fourth Day of February, 2025

Coke Morgan Stewart
*Acting Director of the United States Patent and Trademark Office*